UNITED STATES PATENT OFFICE.

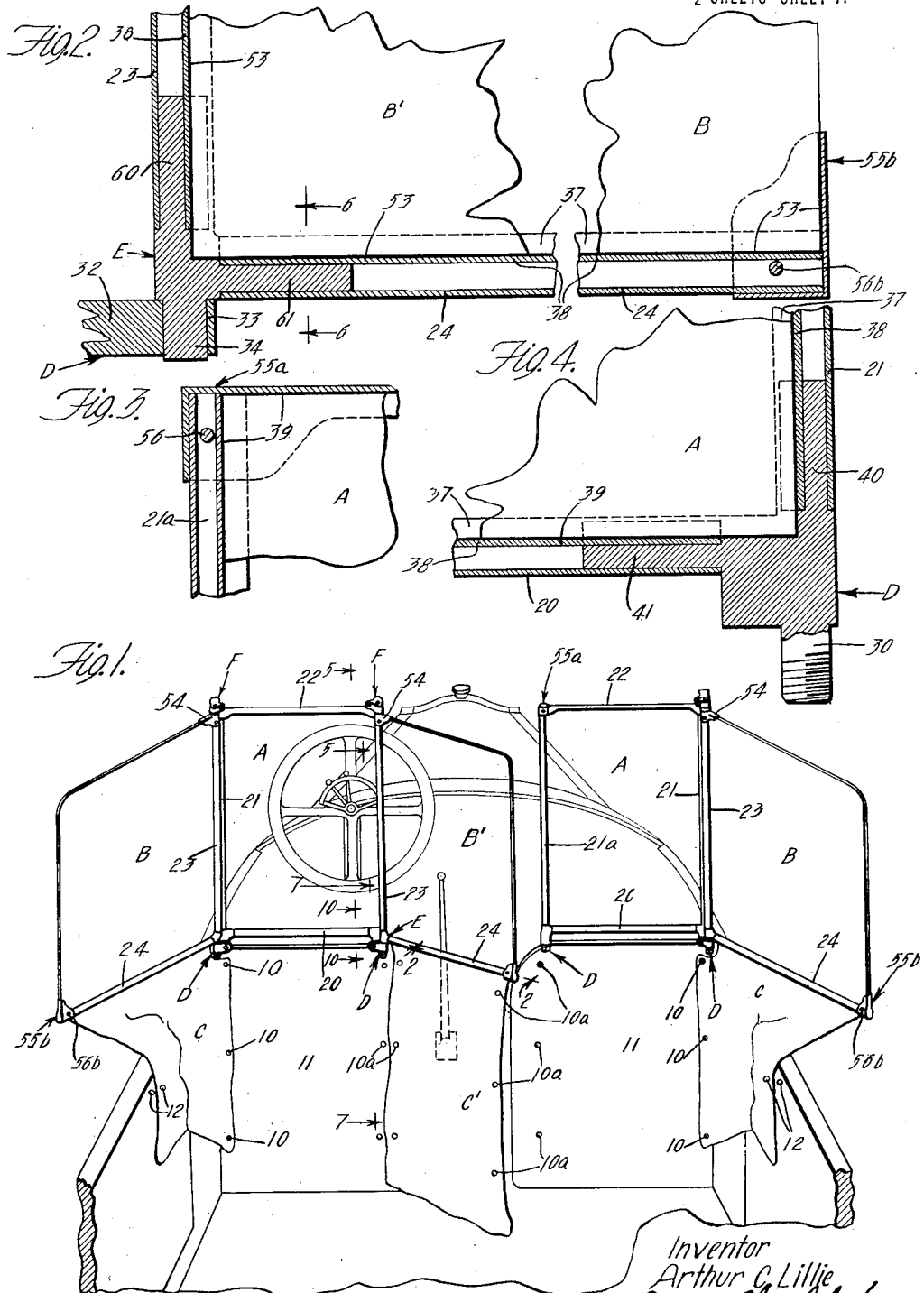

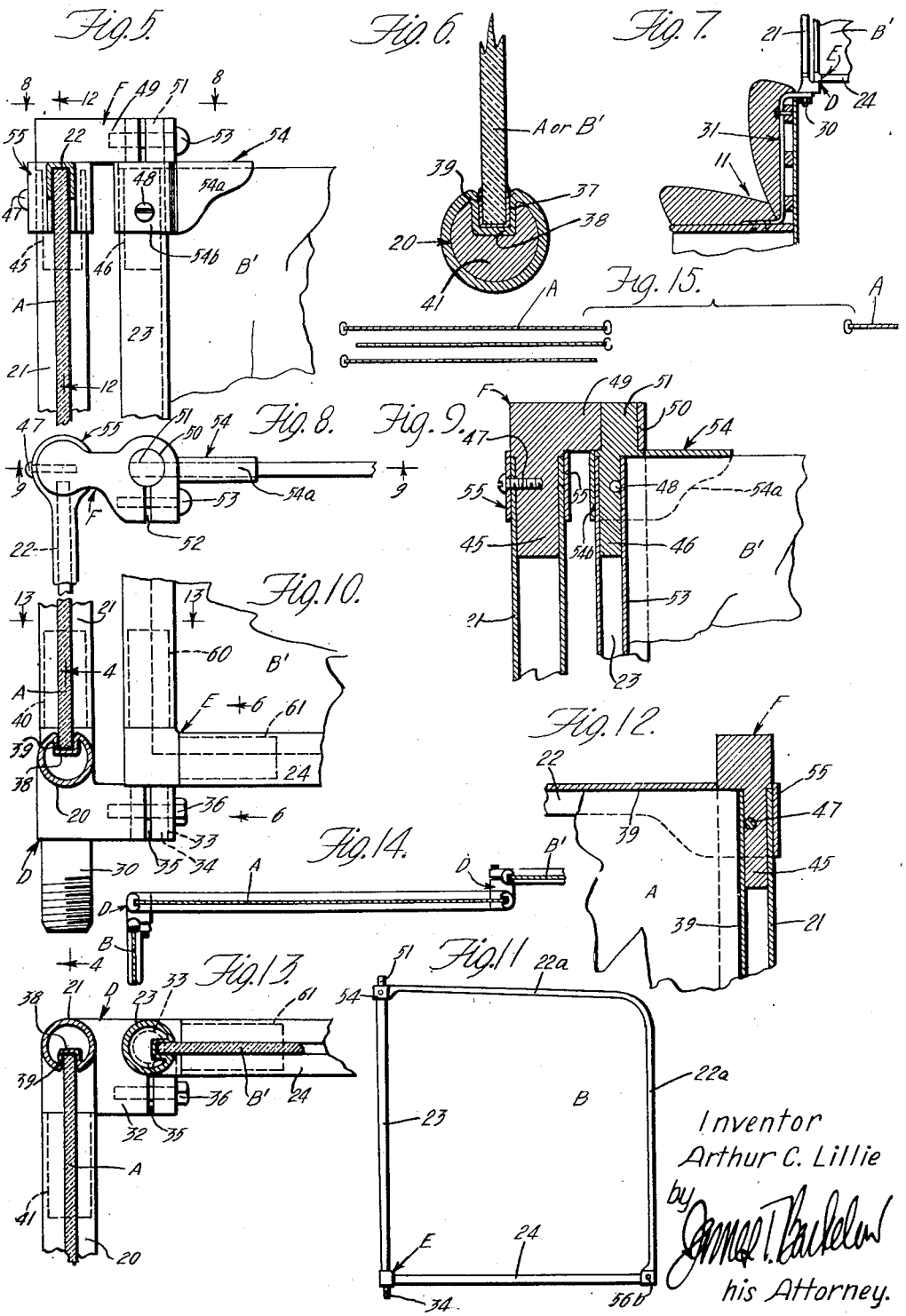

ARTHUR C. LILLIE, OF LOS ANGELES, CALIFORNIA.

DIVIDED-TONNEAU WINDSHIELD.

1,412,475. Specification of Letters Patent. Patented Apr. 11, 1922.

Application filed October 14, 1919. Serial No. 330,608.

*To all whom it may concern:*

Be it known that I, ARTHUR C. LILLIE, a citizen of the United States, residing at Los Angeles, in the county of Los Angeles, State of California, have invented new and useful Improvements in Divided-Tonneau Windshields, of which the following is a specification.

The present invention relates to tonneau windshields and particularly to tonneau windshields for use in connection with vehicles in which the front seat is divided so as to form individual seats with a passage way between them. It is an object of the invention to provide a windshield of this character which is sightly, convenient and effective. This application is a divisional continuation of my application Serial No. 245,027 filed July 15, 1918, for windshields.

It is a particular object of the invention to provide a divided tonneau windshield, for a vehicle body the front seat of which is divided, which will effectively protect the tonneau of the car and which may be set so that it does not restrict or interfere with the passage way between the front seats. By the present invention is provided a windshield comprising a central swinging shield or panel and two permanently mounted shields or panels with which the swinging panel is adapted to co-operate, each of the stationary panels having an outer swinging panel at its outer edge. The swinging panel is arranged in connection with the stationary panels so that it may be set in such a manner as to extend between the stationary panels and thereby form a continuous transverse windshield for the tonneau or it may be set in a position to allow unrestricted passage between the stationary panels. The windshield is not only extremely effective and convenient but is also particularly sightly due to the construction, hereinafter described. In order to further protect the tonneau of the car a curtain is attached to the swinging panel so as to extend or hang downwardly from said panel between the stationary panels and thereby prevent wind from passing under the swinging panel and between the seats.

For the purpose of clearly setting forth further objects and features of the invention, and in order to make clear the construction, reference is had throughout the following detailed description to the accompanying drawings, in which—

Fig. 1 is a perspective view of the device in connection with a typical automobile body having a divided front seat; Fig. 2 is an enlarged detail section taken as indicated by lines 2—2 on Fig. 1; Fig. 3 is a vertical section of a certain part shown in Fig. 1, reference to which will be hereinafter had; Fig. 4 is a vertical section taken on line 4—4 on Fig. 10; Fig. 5 is an enlarged detail section taken on line 5—5 on Fig. 1; Fig. 6 is an enlarged detail section taken on line 6—6 on Fig. 2; Fig. 7 is a section as indicated by line 7—7 on Fig. 1, showing an approved method of mounting the windshield upon the automobile; Fig. 8 is a detail plan taken as indicated by line 8—8 on Fig. 5; Fig. 9 is a vertical section taken as indicated by line 9—9 on Fig. 8; Fig. 10 is an enlarged detail section taken on line 10—10 on Fig. 1; Fig. 11 is a view showing a modification; Fig. 12 is a vertical section taken on line 12—12 on Fig. 5; Fig. 13 is a detail section taken on line 13—13 on Fig. 10; Fig. 14 is a horizontal section showing a modified arrangement; and Fig. 15 is a horizontal section of the windshield in the folded position.

In the drawings are shown two stationary panels A mounted upon the back of individual seats 11. The panels A are glass or the like and have extending from their outer sides panels B, which are pivotally adjustable about vertical axis at their inner edges so that they may be swung outwardly to the position shown in Fig. 1, or may be swung further outwardly so that they are in a position of parallel extension of the panels A; or so that they may be swung inwardly and rearwardly to lie against the panels A. The width of a side panel B is preferably about the same as or somewhat less than that of a panel A. To the under edge of each of these transparent panels B (or to the framing which holds the panels) I secure a curtain or flap C in any suitable manner. The forward vertical end of this curtain may be buttoned or otherwise secured at 10 to the body of the machine; and this curtain is for the purpose of preventing wind passing under the lower edges of the side panels B. Means, such as snap-button means, may be provided at the rear edges of the curtain C and upon the body of the automobile, as shown at 12 for securing the rear edges of the curtain to prevent the wind raising them. Mounted on the inner side of one of the panels A is a swinging panel B' which in all essentials is the same in construction mounting and operation as one of the panels B, and serves to close the opening between the panels A. The panel B' being of the same construction, etc. as panels B a detailed description of panel B' will not be necessary as the description of panels B will be applicable to panel B'. If desired, a curtain C' may also be attached to the lower edge of panel B' as shown in the drawings, to close the lower part of the passage way; and means may be provided, as at 10ª, for fastening the edges of the curtain to the seat backs.

In framing the glass panel I prefer to use tubular framing and thin metal channels; this channel performs as much the office of providing a metal edge for the glass panel as the office of forming a frame; and in the frame this thin metal channel is not a stiff and rigid member but acts merely as a tie, to tie frame parts together. The stationary glasses of panels A are framed each by a lower horizontal tubular frame member 20 and by upright tubular frame members 21, and by an upper horizontal channel member 22 which extends between the upper end of the upright tubular member 21. The side panels B and central panel B' are framed by an upright tubular frame member 23 at their inner vertical edges and by a lower horizontal tubular frame member 24 at their lower edges; the outer and upper edges of these side panels being preferably unframed.

At the place indicated D in the drawings there are corner bracket members which are best illustrated in detail in Figs. 4, 10 and 13. These brackets have on their undersides studs 30 by means of which the brackets are mounted upon mounting brackets 31. The mounting brackets 31, (see Fig. 7) are preferably made of bar iron or steel bent to the configuration shown and secured to the frame work and the forward seat 11 under the cushion of the seat; the rear upper end of mounting brackets 31 projecting rearwardly behind the seat a sufficient distance to allow the corner bracket D to be mounted thereon. Each of these corner brackets D has an extension 32 which extends preferably rearwardly from the bracket, and in the end of this extension there is a vertical bore as shown at 33 which takes the pin or trunnion of bracket E located at the lower inner corner of the adjustable transparent panel B or B'. The part 32 may be split as shown at 35 and a screw or bolt 36 may be used to tighten the part around the trunnion 33, so as to hold the brackets E rigidly in position or so as to make a certain amount of friction sufficient to hold the bracket so that the movable panel B or B' may be moved as desired. The tubular frame members hereinbefore referred to are each of the cross sectional configuration shown in the drawings and particularly shown in Fig. 6. These members have formed in them a longitudinal groove 37, the groove being formed by walls 38 which are integral with the cylindrical walls of the tube. In the grooves 37 the edges of the glass panels are set, a lining of felt or similar substance being interposed at 39. In order to form a strong and rigid connection between the tubular frame members at the corners, the various brackets which are herein described, have plugs which enter the end of the tube; and, in accordance with this general scheme of construction, the brackets D have upright plugs 40 which engage the lower ends of the upper tubular members and have integral horizontal plugs 41 which enter the ends of the lower horizontal tubular members 20. These plugs are of a configuration to fit the inner configuration of the tube; that is, the plugs have slots or grooves which take the groove wall 38 of the tube; and the tube may be sweated, brazed, or otherwise secured to the plug. The construction herein described is typical of all the brackets indicated D in Fig. 1, with exception that the bracket D' has not the extension 32, because at this point it is not necessary to carry an adjustable panel B or B'. Thus it will be seen that these vertical tubular frame members 31 are joined rigidly, and preferably permanently, to the lower horizontal tubular frame members 20 at the corners of the construction. The glass is slipped into place from above downwardly.

At the top of each of the vertical tubular frame members 21 there is a construction which is best shown in Figs. 5, 8, 9 and 12. At the upper ends of the vertical tubular frame members 21 there are located brackets F which comprise each a vertical plug which extends downwardly into the upper end of tube 20 (being of the same construction as shown for plug 41 in Fig. 6 and fitting around the groove portion of the tube) and a horizontal portion 49 which has in its end a vertical bore 50 adapted to receive the pin or pins 51 of a member which comprises this pin 51 and a plug 46 which extends down into the upper end of tubular member 23. In fact, this member, comprised of the parts 51 and 46, may be served a pivot member as its purpose is to provide merely a turning pin or trunnion for the upper end of tube 23. The part 49 of bracket F is provided with a slot 52 and clamping screw 53ª for the purpose of tightening on the pin 51. The glass panel B' is set with its vertical edge in the groove of tubular member 23, with an interposed felt at 53; the upper edge of this glass panel is left unframed. At the inner upper corner I merely employ a small corner cap 54. This corner cap has a channel shaped portion 54ª which fits over the upper edge of the glass and has cylindrical portion 54ᵇ which fits over and around the upper end of tube 23. This corner cap is held in position with reference to the upper end of the tubular member 23, by means of a screw 48; so that the parts are removable in order to remove the glass. The plug 45 of bracket F is also removably mounted in the upper end of the tube 21 and is held in place by a screw 47; this screw 47 also holding in place a cap 55 which fits over and around the end of the tube 21. This cap 55 is similar to the corner cap 54; excepting that the cap 55 is joined integrally to the channel shaped frame member 22 which extends clear across the upper edge of the glass panel A and joins with the similar cap 55 at the opposite vertical edge of the glass. Or, in the case of the panel A at the right in Fig. 1 the other end of this horizontal frame member 22 joins with a cap 55ª which is mounted upon the upper end of the tube 21ª; no bracket or plug construction being used at the upper end of this tube. This is particularly shown in Fig. 3. The cap 55ª is held in place by the screw 56.

It will be readily understood how the glass panels A are framed by the various members, and how the frame members are joined by the various corner bracket constructions. It will be noted that the glass is held rigid by the permanently connected frame work on three sides; only the upper member of the frame work being removable for the purpose of inserting or replacing the glass. The glass fits on three of its edges, its lower and two vertical side edges, in the channels 37 of the tubular frame member; and on its upper edge it fits in the channel shaped member 22. On all edges of the frame a felt liner 39 is used.

The lower end of the vertical tubular frame members 23 are preferably mounted upon vertical plug 60 of bracket members E, hereinbefore referred to. These bracket members are supported on their pins or trunnions 34 fitting in the bracket members D; and they have horizontally extending plugs 61 which fit into the inner ends of the horizontal lower tubular frame members 24. These plugs 60 and 61 are of the same configuration as hereinbefore explained; and may be brazed or otherwise secured to the tubular frame members. The glasses B and B' fit in the groove 37 of these tubular frame members, felt being interposed at 53 around the edges of the glass. At the outer ends of horizontal frame members 24 there are caps 55ᵇ, removably mounted upon these tubular members 24 and held in place by screws 56ᵇ. The construction of these caps 55ᵇ is the same as that of 55ª, excepting that the caps 55ᵇ are not joined to any edge framing member 22 but are merely used to cap the outer lower corners of the glasses B and B'. The caps 55ª and 55ᵇ will be closed at their ends; whereas caps 55 and 54 are opened at their ends to allow the passage of the plugs 45 and 46.

The glasses B and B' may be left unframed or unbound along their upper and outer edges as described, or may be bound by a channel shaped binding means 22ª which joins the cap 54 and 55ᵇ and extends along the upper and outer edges of the glass.

In order to facilitate snug folding of the shield the brackets D and F on the right hand edge of the left hand panel A may be made to project their extensions forwardly instead of rearwardly as shown and as is usually the case. The brackets D and F, as will be noted, are made in "rights" and "lefts;" and by using two sets of "lefts" for the left hand panel A the panel B' is thrown forward of the panel A and may then be folded onto the forward face of panel A instead of the rear face. This facilitates the folding of the panel B onto the rear face of panel A. This arrangement of the parts is shown in Fig. 14, which shows the panel B' situated ahead of panel A. However, in the usual arrangement the panel B' may be behind panel A, as is indicated in the various detail figures; and, to facilitate its folding behind the panel A, along with the left hand panel B, the brackets D and F may be made of different lengths so as to throw one of the movable panels behind the other. For instance, in the brackets D and F which carry the left hand panel A the sockets for pins 34 and 51 may be further back than are those sockets on the brackets D and F carrying the panel B'; or the arrangement may be reversed. In either case the two panels B and B' may be folded into parallel positions behind the panel A and close to it. Such an arrangement is shown in Fig. 15. Panel B' is preferably not more than the width of panel A.

When the side panels B are in the approximate position shown in Fig. 1 or extending directly rearwardly, then they reach rearwardly quite or almost to the forward edge of the rear side curtain (permanent or temporary) of the machine's top. Thus in a body designed where the side curtains extend fairly well forwardly, my windshield practically completely closes the forward part of the tonneau space and makes it in effect an enclosed car. I find this construction to be very effective in practical results, enclosing the rear part of the automobile against wind and with fair effectiveness against rain, and making the rear part of an ordinary touring car more comfortable than is ordinarily the case. The provision of the panel B' on the right hand edge of the left hand panel A makes it possible to completely separate or close off the tonneau from the forward part of the machine. When the panel B' is set so as to extend between the inner edges of the panels A, that is, when the panel B is set so that a continuous windshield is formed across the front of the tonneau, the shield is as effective as a continuous shield would be and the panel B' being pivotally adjustable about a vertical axis, allows it to be swung back or inwardly in the tonneau so as to leave an unrestricted passage between the seats 11. It will be readily seen that this construction is particularly desirable as it combines the comfort and protection of a continuous windshield with the convenience of a divided windshield.

Having described a preferred form of my invention, I claim:

1. In a tonneau windshield two stationary panels spaced apart, a swinging panel attached to the inner edge of one of the stationary panels and adapted to extend between the stationary panels, and a swinging panel at the outer edge of each stationary panel.

2. In combination with a divided vehicle seat embodying two individual seat portions and a passage-way between them; a windshield embodying a pair of stationary panels set on and above the backs of the two seat portions, and a central movable panel adapted to be moved to and from a position across the passage-way.

3. In combination with a divided vehicle seat embodying two individual seat portions and a passage-way between them; a windshield embodying a pair of stationary panels set on and above the backs of the two seat portions, a central movable panel adapted to be moved into position across the passage-way, and adapted to be moved also into a position against one of the stationary panels and swinging panels mounted at the outer edges of the stationary panels.

4. In combination with a divided vehicle seat embodying two individual seat portions and a passage-way between them; a windshield embodying a pair of stationary panels set on and above the backs of the two seat portions, a central movable panel adapted to be moved to and from a position across the passage-way, and adapted to be moved also into a position against one of the stationary panels; and a movable side panel at the outer edge of each stationary panel adapted to be folded against the adjacent stationary panel, said side panels and the central panel being of widths not greater than the stationary panels.

5. The combination with a vehicle seat embodying two individual seat portions separated by a passageway, of a windshield comprising a stationary transparent panel secured to and rising above the top of each said individual seat portion, at the sides of the passageway, and a third transparent panel mounted to move to and from a position across said passageway in substantial alinement with the stationary panels.

In witness that I claim the foregoing I have hereunto subscribed my name this 7th day of October, 1919.

ARTHUR C. LILLIE.

Witness:
VIRGINIA BERINGER.